United States Patent
Haddorp et al.

(10) Patent No.: US 11,768,865 B2
(45) Date of Patent: *Sep. 26, 2023

(54) TAG WEIGHTING ENGINE USING PAST CONTEXT AND ACTIVE CONTEXT

(71) Applicant: International Business Machines Corporation, Armonk, NY (US)

(72) Inventors: Hendrik Haddorp, Holzgerlingen (DE); Timo Kussmaul, Boeblingen (DE); Stephan Laertz, Herrenberg (DE); Andreas Nauerz, Stuttgart (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 517 days.

This patent is subject to a terminal disclaimer.

(21) Appl. No.: 16/392,636

(22) Filed: Apr. 24, 2019

(65) Prior Publication Data

US 2019/0251106 A1 Aug. 15, 2019

Related U.S. Application Data

(63) Continuation of application No. 15/232,276, filed on Aug. 9, 2016, now Pat. No. 10,303,707, which is a (Continued)

(30) Foreign Application Priority Data

Sep. 18, 2009 (EP) .................................... 09170718

(51) Int. Cl.
*G06F 16/907* (2019.01)
*G06F 16/9535* (2019.01)
(Continued)

(52) U.S. Cl.
CPC .... *G06F 16/3334* (2019.01); *G06F 16/24573* (2019.01); *G06F 16/24575* (2019.01); (Continued)

(58) Field of Classification Search
CPC ............... G06F 16/3334; G06F 16/907; G06F 16/9535; G06F 16/24573; G06F 16/24575; G06F 16/24578
See application file for complete search history.

(56) References Cited

U.S. PATENT DOCUMENTS

| 7,979,411 B2 | 7/2011 | Mattox, Jr. et al. |
| 8,245,122 B2 | 8/2012 | Liu et al. |

(Continued)

FOREIGN PATENT DOCUMENTS

| TW | 200935250 A | 12/2008 |
| TW | 200903265 A | 1/2009 |

(Continued)

OTHER PUBLICATIONS

Firan, C.S. et al., "The Benefit of Using Tag-Based Profiles," In IEEE 5th Latin America Web Congress, Oct. 31, 2007, pp. 32-41.
(Continued)

*Primary Examiner* — Cheyne D Ly
(74) *Attorney, Agent, or Firm* — CUENOT, FORSYTHE & KIM, LLC

(57) ABSTRACT

The present invention provides a method and system for storing and retrieving tags. Each tag is associated with a resource, upon a user's request. A tagging GUI is displayed which presents the available tags for one particular resource and/or a tag cloud GUI is displayed which presents tags for more than one resource. The tagging GUI allows to assign new tags to single resources. The tag cloud GUI enables users to search for resources which have been assigned certain tags. In the tag cloud GUI the relevancy of each
(Continued)

single tag is visually reflected by its weighting factor which is determined by the frequency of occurrence. The method is characterized by the further steps:
- determining a quantitative weighting factor for each single tag by invoking a quantitative-engine, and/or
- determining a reputation weighting factor for each single tag by invoking a reputation-engine, and/or
- determining a context weighing factor for each single tag by invoking of a context-engine,
- determining a expiry weighting factor for each single tag by invoking a expiry-engine, and/or
- determining a overall weighting factor for each of said single tag by calculating the average of all the weighting factors, and
- visually reflecting the relevance of each single tag in the tag cloud based on said determined overall weighting factor.

5 Claims, 7 Drawing Sheets

Related U.S. Application Data continuation of application No. 13/496,644, filed as application No. PCT/EP2010/059852 on Jul. 9, 2010, now Pat. No. 9,424,368.

(51) Int. Cl.
  G06F 16/2457 (2019.01)
  G06F 16/33 (2019.01)
(52) U.S. Cl.
  CPC ...... G06F 16/24578 (2019.01); G06F 16/907 (2019.01); G06F 16/9535 (2019.01)

(56) References Cited

U.S. PATENT DOCUMENTS

| | | |
|---|---|---|
| 8,843,482 B2 | 9/2014 | Buriano et al. |
| 9,424,368 B2 | 8/2016 | Haddorp et al. |
| 9,424,369 B2 | 8/2016 | Haddorp et al. |
| 9,424,584 B2 | 8/2016 | Klappert et al. |
| 2004/0006740 A1* | 1/2004 | Krohn ............... G06F 16/951 707/E17.108 |
| 2005/0289469 A1* | 12/2005 | Chandler ............ H04N 7/163 715/745 |
| 2007/0118508 A1* | 5/2007 | Svendsen ............ H04N 1/21 707/E17.031 |
| 2007/0198506 A1* | 8/2007 | Attaran Rezaei ..... G06F 16/367 707/999.005 |
| 2007/0250810 A1 | 10/2007 | Tittizer et al. |
| 2008/0016072 A1 | 1/2008 | Frieden et al. |
| 2008/0052369 A1 | 2/2008 | Weber et al. |
| 2008/0065995 A1* | 3/2008 | Bell ............... G06F 40/117 715/751 |
| 2008/0071929 A1 | 3/2008 | Motte et al. |
| 2008/0114778 A1 | 5/2008 | Siegel |
| 2008/0168055 A1 | 7/2008 | Rinearson et al. |
| 2008/0244038 A1 | 10/2008 | Martinez |
| 2008/0282198 A1* | 11/2008 | Brooks ............... G06F 16/9562 715/854 |
| 2008/0313541 A1 | 12/2008 | Shafton et al. |
| 2009/0043789 A1 | 2/2009 | Gupta et al. |
| 2009/0100407 A1 | 4/2009 | Bouillet |
| 2009/0144254 A1 | 6/2009 | O'Sullivan et al. |
| 2009/0164897 A1 | 6/2009 | Amer-Yahia et al. |
| 2010/0146015 A1* | 6/2010 | Milic-Frayling ....... G06F 16/16 707/812 |
| 2010/0229082 A1 | 9/2010 | Karmarkar et al. |
| 2011/0314061 A1 | 12/2011 | Lara |
| 2012/0173551 A1 | 7/2012 | Haddorp et al. |
| 2013/0014060 A1 | 1/2013 | Haddorp et al. |
| 2016/0350313 A1 | 12/2016 | Haddorp et al. |
| 2016/0350402 A1 | 12/2016 | Haddorp et al. |

FOREIGN PATENT DOCUMENTS

| | | |
|---|---|---|
| TW | 200910952 A | 3/2009 |
| WO | 2011032742 A1 | 3/2011 |

OTHER PUBLICATIONS

WIPO Appln. No. PCT/EP2010/059852, International Search Report, dated Nov. 12, 2010, 2 pg.
WIPO Appln. No. PCT/EP2010/059852, International Preliminary Examination Report, dated Mar. 20, 2012, 5 pg.
U.S. Appl. No. 13/496,944, Non-Final Office Action, dated Aug. 7, 2013, 8 pg.
U.S. Appl. No. 13/496,944, Final Office Action, dated Nov. 19, 2013, 9 pg.
U.S. Appl. No. 13/496,944, Non-Final Office Action, dated Jul. 3, 2014, 15 pg.
U.S. Appl. No. 13/496,944, Non-Final Office Action, dated Jan. 5, 2015, 15 pg.
U.S. Appl. No. 13/496,944, Final Office Action, dated Jun. 25, 2015, 16 pg.
U.S. Appl. No. 13/496,944, Notice of Allowance, dated May 18, 2016, 9 pg.
U.S. Appl. No. 13/617,822, Non-Final Office Action, dated Aug. 15, 2014, 15 pg.
U.S. Appl. No. 13/617,822, Non-Final Office Action, dated Jan. 5, 2015, 15 pg.
U.S. Appl. No. 13/617,822, Final Office Action, dated Jun. 25, 2015, 17 pg.
U.S. Appl. No. 13/617,822, Notice of Allowance, dated May 17, 2016, 10 pg.
Bischoff et al., "Can All Tags be Used for Search?" In Proc.of the 17th ACM Conf. on Information and Knowledge Management, Oct. 26, 2008, pp. 193-202.
U.S. Appl. No. 15/232,329, Non-Final Office Action, dated Sep. 12, 2017, 14 Pg.
U.S. Appl. No. 15/232,329, Final Office Action, dated Apr. 9, 2018, 14 Pg.
U.S. Appl. No. 15/232,329, Notice of of Allowance, dated Jan. 15, 2019, 7 pg.
U.S. Appl. No. 15/232,276, Non-Final Office Action, dated Feb. 27, 2017, 12 pg.
U.S. Appl. No. 15/232,276, Non-Final Office Action, dated Sep. 12, 2017, 15 pg.
U.S. Appl. No. 15/232,276, Notice of of Allowance, dated Jan. 15, 2019, 7 pg.
Neal, D. "Folksonomies and image tagging: Seeing the future," Bulletin of the American Society for Information Science and Technology. Oct. 2007;34(1):7-11.
Noël S. et al., "Sharing vocabularies: tag usage in citeulike," People and Computers XXII Culture, Creativity, Interaction 22. Sep. 2008:71-4.
Sinclair, J. et al., "The Folksonomy Tag Cloud: When is it useful?", Journal of Information Science. Feb. 2008;34(1):15-29.
Zanardi, V., "Social ranking: uncovering relevant content using tag-based recommender systems," InProceedings of the 2008 ACM conference on Recommender systems Oct. 23, 2008 (pp. 51-58).
U.S. Appl. No. 16/392,631, Non-Final Office Action, dated May 26, 2021, 8 pg.
U.S. Appl. No. 16/392,631, Non-Final Office Action, dated Oct. 20, 2021, 10 pg.

* cited by examiner

Details

Portlet 1
Description of Portlet 1

Tags: Tag0, Tag1, Tag2

[ Done ]  [ Cancel ]

FIG. 1B

Tags

All | My | Latest | Most popular
Cloud | List | ...

Select scope

Tag0 Tag1 Tag2

Tag3 Tag4 Tag5

Tag6 Tag7

FIG. 1C

Detail

Portlet 1 ★★☆☆☆
Description of Portlet 1

Tags: Tag0, Tag1, Tag2

Comments:
Date, Time by Person
This is a comment

More...

[ Done ]  [ Cancel ]

FIG. 1D

TAG WEIGHTING ENGINE USING PAST CONTEXT AND ACTIVE CONTEXT

FIELD OF INVENTION

The present invention relates to a method and system for storing and retrieving tags.

BACKGROUND OF THE INVENTION

In recent years web-based systems such as Enterprise Information Portals have gained importance in many companies. Latter integrate, as a single point of access, various applications and processes into one homogeneous user interface.

Today, such systems are comprised of a huge amount of content. They are no longer exclusively maintained by an IT department instead, Web 2.0 techniques are used increasingly, allowing user generated content to be added. These systems grow quickly and in a more uncoordinated way as different users possess different knowledge and expertise and obey to different mental models.

The continuous growth makes access to really relevant information difficult. Users need to find task- and role-specific information quickly. Thus, users often miss out on resources that are potentially relevant to their tasks, simply because they never come across them. On the one hand, users obtain too much information that is not relevant to their current task, on the other hand, it becomes cumbersome to find the right information and they do not obtain all the information that would be relevant.

The recent popularity of collaboration techniques on the Internet, particularly tagging and rating, provides new means for both semantically describing Portal content as well as for reasoning about users' interests, preferences and contexts.

Tagging is the process of assigning keywords (or metadata) to resources. A tag itself is "some" metadata associated to a resource. Tags themselves are non-hierarchical keywords taken from an uncontrolled vocabulary. A resource is an entity uniquely identifiable (addressable).

Tags can add valuable meta-information and even lightweight semantics to web resources.

Rating is the evaluation or assessment of something, in terms of quality (as with a critic rating a novel), quantity (as with an athlete being rated by his or her statistics), or some combination of both. I.e. it is the process of assigning (e.g. numeric) "values" to resources indicating how much people "like" those. A rating itself is "some value" associated to a resource. Ratings themselves are chosen from an interval of possible "values" whereas the one end of the interval usually refers to "dislike" and the other to "like".

STATE OF THE ART

FIG. 1 A depicts the main components available in the prior art tagging-enabled system:

The system is comprised of server side 1 and client side components 2 as in typical web (client/server) architectures.

The client-side 1 is comprised of user-interfacing components (40) which run in web clients (usually browsers). These user-interfacing components fulfill two tasks: first, allowing users to assign new tags (or ratings) to resources, second allowing users to inspect available tags (or ratings) for one or a set of resources (information retrieval).

Tag widgets (400) enable people to tag resources/content. Tag clouds (410) are the visual depiction of all tags available in the system. Latter allow people to navigate through the entire tag space. Rating (420) widgets enable people to rate resources/content.

FIG. 1 B shows a typical tag widget. The tag widget is always invoked for exactly one single resource, e.g. a page or a portlet for which either the available tags shall be inspected or to which new tags shall be assigned. The tag widget usually displays some detail data about the resource itself, e.g. title and description and the tags being already available. It provides an input field to specify new tags and buttons to apply/submit these new tags.

FIG. 1 C shows a typical tag cloud. The tag cloud is usually invoked for a certain scope (set of resources, e.g. all books or all movies available in the system). The tags being displayed is the set of all tags that have been assigned to all resources within the current scope. The font size of a tag represents how often this tag has been applied with respect to the current scope. Often users can switch between different views, e.g. a view displaying all tags, a view displaying the tags recently added, a view displaying the tags most often clicked, a view containing only the tags he applied himself and so forth. A slider often allows to display more or less tags.

FIG. 1 D shows a typical rating widget (embedded in a tag widget). The 5 stars presented at the top indicate how good the resource has been rated—1 highlighted star usually means "poorly" rated, 5 usually "excellent" rated; users can apply their own rating by clicking on one of the 5 starts displayed.

The server side 2 is structured as follows:

At the bottom level it is shown the system storage (10) which maintains which resources (130) and users (140) exist in the system. Users can assign tags (101) stored in the tag storage (100) to these resources; similar ratings (121) can be stored.

The weighting engine (20) is responsible for calculating the weighting (i.e. importance) for each single tag before it is displayed to a user.

The service API (30) allows interacting with the system.

For end-users tag weightings become apparent in tag clouds which display available tags with respect to a certain scope. More often applied tags are displayed larger than less often applied ones.

FIG. 1 E shows the prior art interaction process in a tag-enabled system. For inspecting which tags are available for a certain resource the user first invoked the tag widget (1), which calls the service APIs asking for the available tags (2), which calls the tag weighting engine (3) which retrieves the list of available tags from the data storage (4). The tag weighting engine then calculates the tag weights based on tag "frequency" (5) and returns the result via the service APIs back to the tag widget (6) which displays the tags (7).

Optionally the user can then specify new tags (8) which are then stored via the service APIs in the data storage (9).

Note that the process is similar for interacting with the tag cloud, except that here tags are retrieved for more than one resource and new tags cannot be applied.

US20080168055A1 discloses a system in which a content item may be associated with metadata comprising one or more tags. A user may indicate a relevance rating associated with a tag. The relevance rating may indicate whether the user feels the tag is relevant to a particular content item. Using a plurality of user-provided relevance ratings, a tag relevance model may be established. A tag relevance model may comprise a weighted or un-weighted average and/or median relevance rating of the tag and/or a consistency of the relevance rating. The tag relevance model may be used to order or otherwise inform search results. Tag ratings may also be used to aggregate users into groups comprising users having a similar point of view relative to one or more tag ratings. In addition, users may be grouped according to content access and/or tags rated regardless of the relevance rating applied.

US20090043789A1 discloses an information system which includes at least one data storage device accessible through a network for storing tags and tag attribute data, a server connected to the network and to the at least one data storage device for serving tags and tag attribute data and for receiving tags and tag attribute data, and one or more processors connected to the server and to the at least one data storage device, the processor or processors running sets of instructions for managing the tags and tag attribute data.

In prior art tag-enabled systems the weighting (i.e. the importance) of tags only depends on the frequency of their occurrence. I.e. a tag applied more often with respect to a certain scope is regarded of higher importance than a tag applied less often.

OBJECT OF THE PRESENT INVENTION

It is object of the present invention to provide an improved mechanism for adapting tag weightings according to different metrics.

This object is solved by the features of the independent claims.

Further preferred embodiments of the present invention are laid down in the dependent claims.

SUMMARY OF THE INVENTION

The present invention provides a method and system for storing and retrieving tags. Each tag is associated with a resource, upon a user's request. A tagging GUI is displayed which presents the available tags for one particular resource and/or a tag cloud GUI is displayed which presents tags for more than one resource. The tagging GUI allows to assign new tags to single resources. The tag cloud GUI enables users to search for resources which have been assigned certain tags. In the tag cloud GUI the relevancy of each single tag is visually reflected by its weighting factor which is determined by the frequency of occurrence. The method is characterized by the further steps:

determining a quantitative weighting factor for each single tag by invoking a quantitative-engine, and/or determining a reputation weighting factor for each single tag by invoking a reputation-engine, and/or determining a context weighing factor for each single tag by invoking of a context-engine determining a expiry weighting factor for each single tag by invoking a expiry-engine, and/or determining the overall weighting factor for each of said single tag by calculating the average of all the weighting factors, and visually reflecting the relevance of each single tag in the tag cloud based on its determined overall weighting factor.

In a preferred embodiment the quantitative-engine comprises the steps of:

a) Receiving a portal page including a tag widget and/or the tag cloud and a GUI.

b) Providing user-based tag weighting adaptation options by displaying -, + and ! (not) icons for each tag.

c) Triggering user-based tag weighting adaptation by letting the user click on the displayed -, +, or ! icon.

d) Increasing or decreasing the tag count depending on the user's interaction.

In a further preferred embodiment the reputation-engine comprises the steps of:

a) Receiving a portal page including a tag widget allowing to tag a certain item.

b) Allowing the user to specify tags to be applied to the item to be tagged.

c) Before storing the tag calculating the user's reputation to associate a weighting to the tag being applied Possible metric: How many tags has the user already applied?

Possible metric: What is the average rating of the tags the users has applied? (Req. the option to rate tags)

d) Storing the tag together with the user reputation-based weighting.

In further preferred embodiment the expiry-engine comprises the steps of:

a) Receiving a portal page including a tag widget allowing to tag a certain item.

b) Allowing the user to specify tags to be applied to the item to be tagged.

c) Allowing to specify validate dates for the tag (start date, end date, etc.) describing in which time frames it should live.

d) Storing the tag together with its "validity range".

In a further preferred embodiment the context-engine comprises the steps of:

a) Receiving a portal page including a tag widget allowing to tag a certain item.

b) Allowing the user to specify tags to be applied to the item to be tagged.

c) Further allowing to specify the context in which this tag should be valid or automatically detecting the context in which it is applied d) Storing the tag together with its context profile.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 1A:
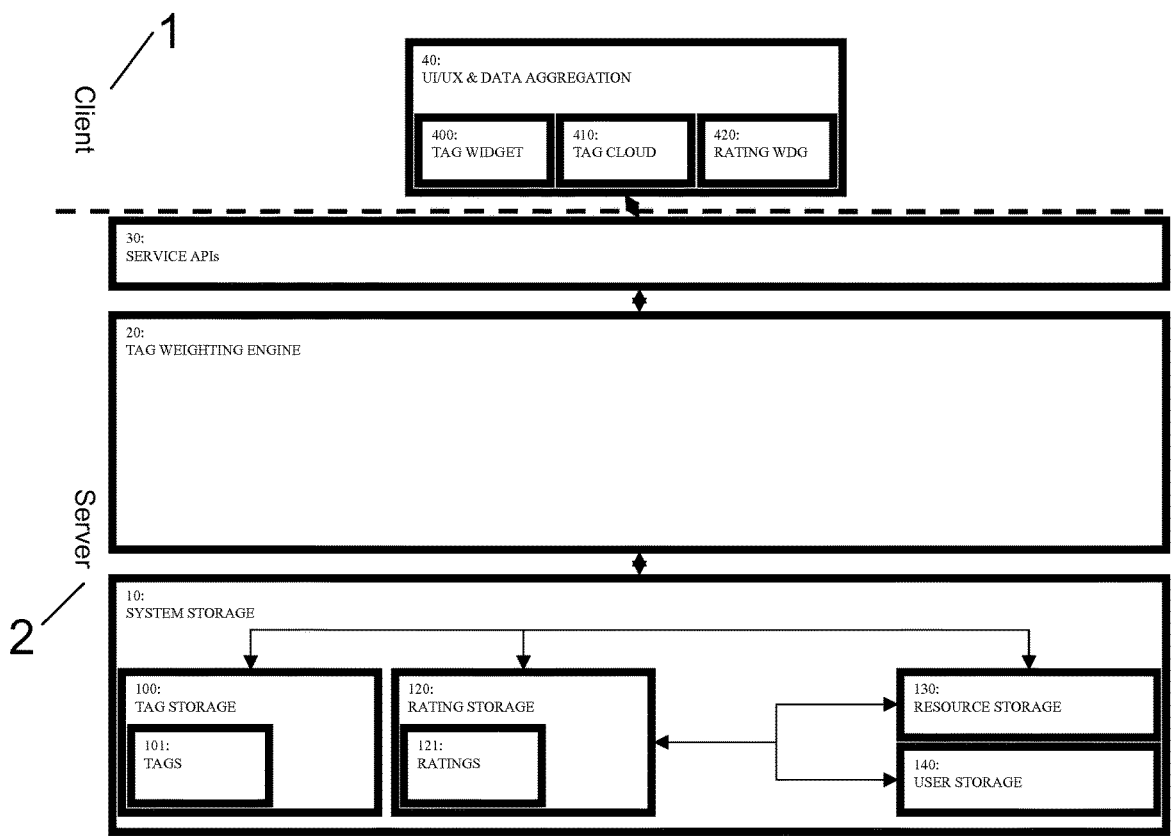
FIG. 1 A illustrates the main components available in a prior art tagging-enabled system, FIG. 1 B-D illustrates prior art tag widgets invoked by the prior art tagging-enabled system, FIG. 1 E illustrates the interaction process within a prior art tagging-enabled system, FIG. 2 A illustrates the inventive tagging-enabled system, FIG. 2 B shows a preferred embodiment of the storage implementation of the present invention, FIG. 2 C illustrates the inventive tag widget for quantitative tagging, FIG. 2 D illustrates the inventive tag widget for reputation tagging, FIG. 2 E illustrates the inventive tag widget for expiry tagging, and FIG. 2 F illustrates the interaction process within the inventive tagging-enabled system.
Figure 1E:
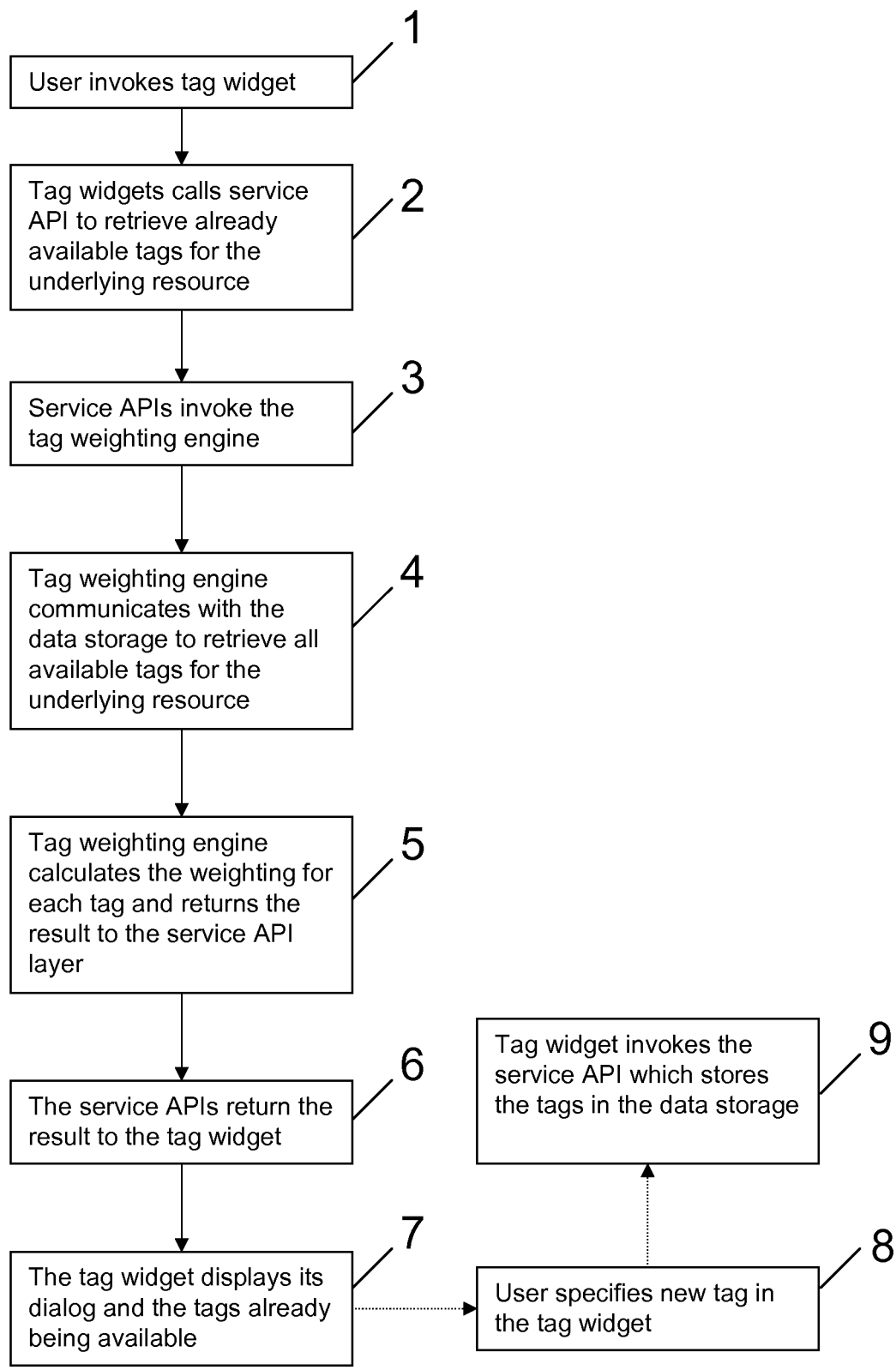
Figure 2A:
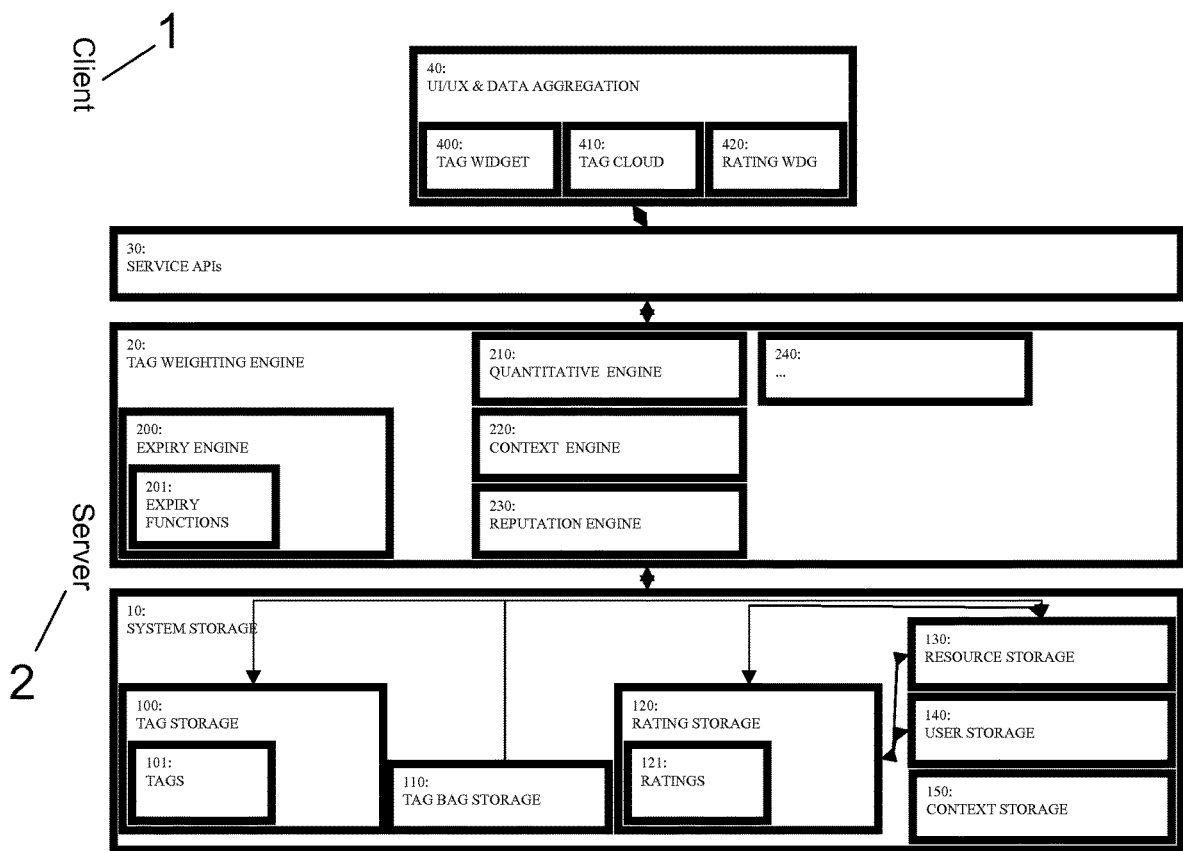
Figure 2B:
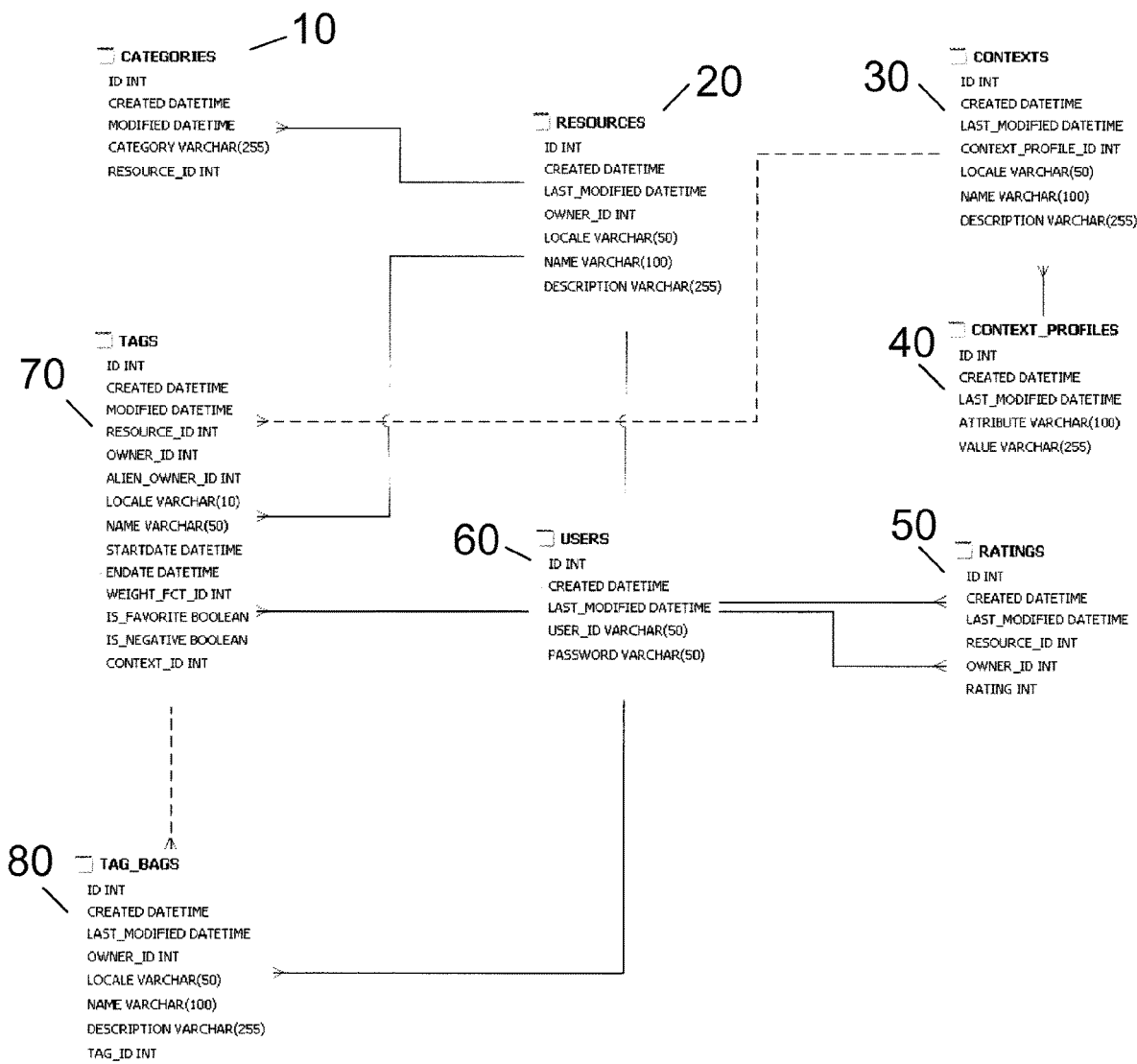
Figure 2C:
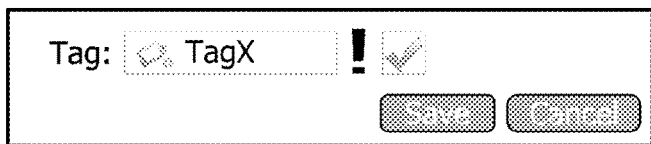
Figure 2C:
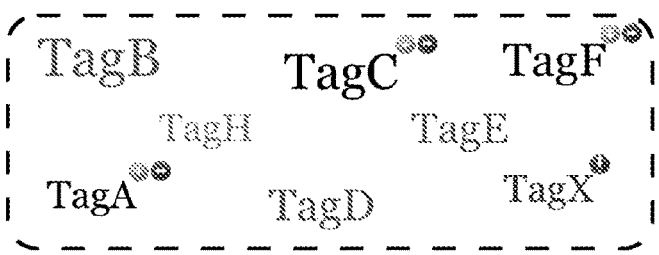
Figure 2D:
Figure 2D:
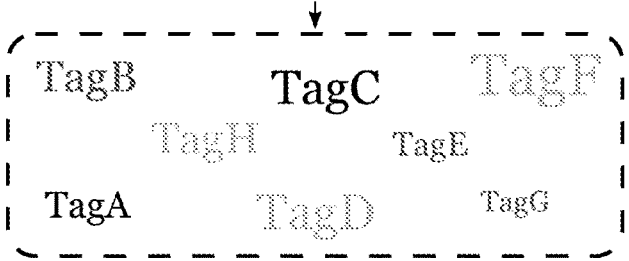
Figure 2E:
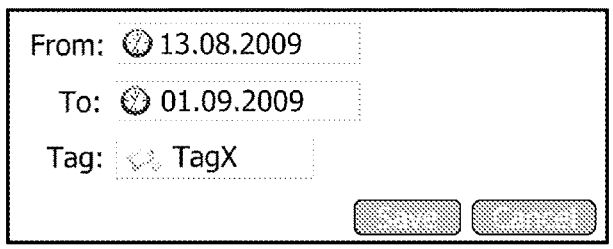
Figure 2E:
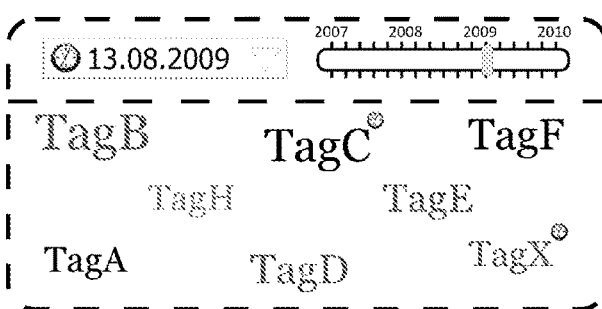
Figure 2F:
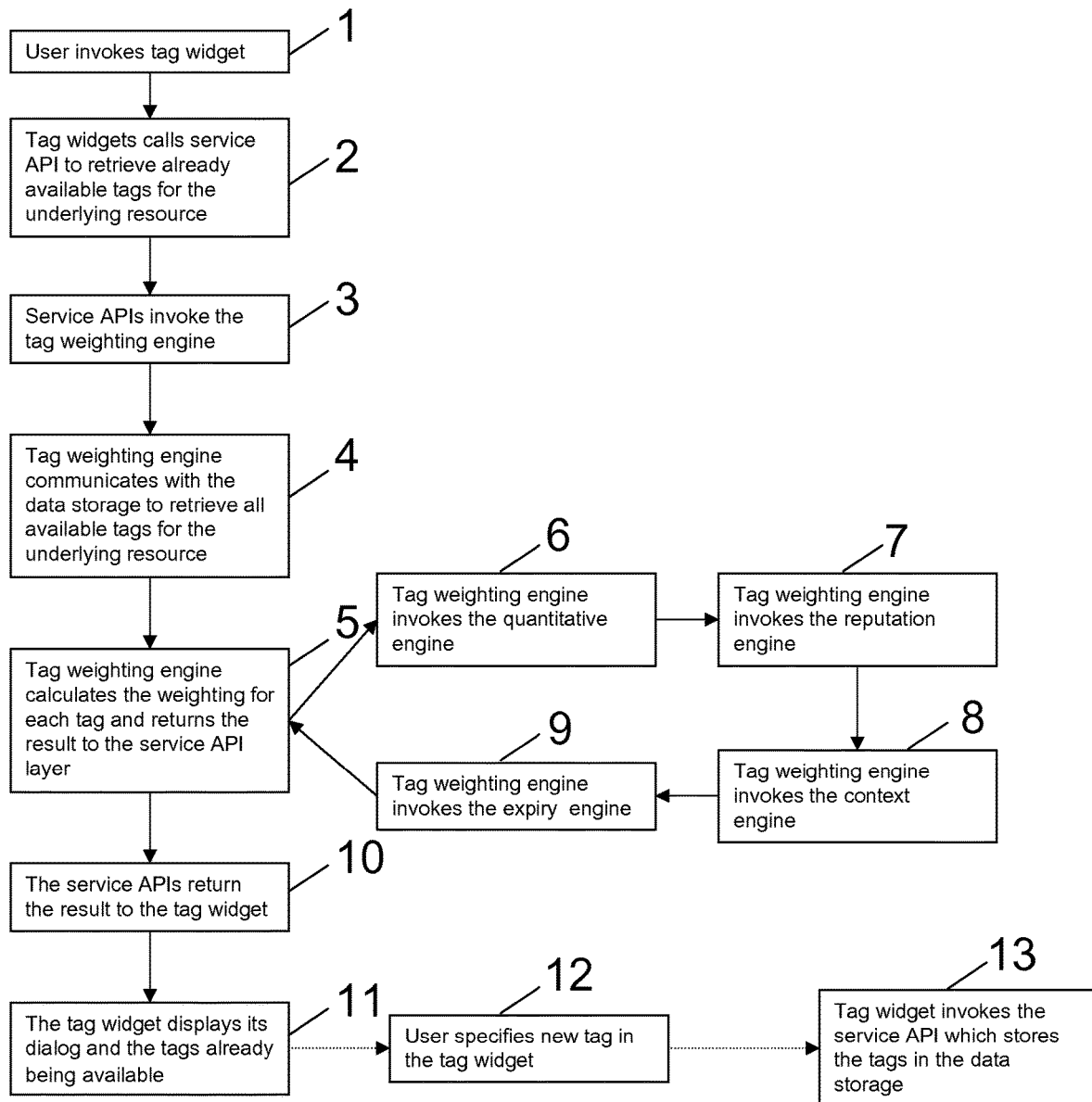

FIG. 2 A illustrates the new weighting engines added to the prior art tagging-enabled system.

Quantitative-Engine 210

In the prior art systems it is assumed that tags can only have "positive character".

I.e. it is assumed that a resource can be tagged with a term to describe that the resource has something to do with this term, but also assumed that a resource cannot be tagged with a term to describe that the resource has nothing to do with it. It is latter referred as negative tagging. Negative tagging can be done manually (the user specifies a tag to be negative) or automatically (the system recognizes that a certain term is the opposite of another). In the first scenario a user could explicitly tag some pages with "soccer" and a subset of them with "not Germany" to indicate that some of the tagged soccer pages have nothing to do with German soccer.

In addition to that aspect there are usually no means for single users to express that a certain tag is of less relevancy for them.

In a preferred embodiment of the present invention the interaction process based on the Quantitative Engine 210 comprises the following steps:

a) Receiving a portal page including a tag widget and/or the tag cloud and a GUI, b) Providing user-based tag weighting adaptation options by displaying –, + and ! (not) icons for each tag, c) Triggering user-based tag weighting adaptation by letting the user click on the displayed –,+, or ! icon, and d) Increasing or decreasing the tag count depending on the users interaction.

As indicated, in the preferred embodiment a plus- and a minus sign is presented besides each tag being displayed. In addition, when applying a tag, a not-sign is presented.

Clicking the not-sign when applying a tag allows users to express that a resource has nothing to do with the term applied, a helpful feature for more fine-granular categorization of resources.

E.g., users could tag some resources with the term "Web 2.0" and a few of them with "not" "scientific". This helps users to quickly find all Web 2.0 related resources and to quickly distinguish between the scientific and non scientific ones among them.

Reputation-Engine 230

As explained above, in the prior art systems it is assumed that the weighting (i.e. the importance) of tags only depends on the frequency of their occurrence.

The present invention additionally allows the weighting of a tag to be dependent on the reputation (or expertise) of a user. I.e. that tags applied by more experienced users have higher weightings, and thus higher influence on what content the community is presented (or recommended) with, than tags from less experienced users.

The present invention allows to point users to more relevant content as we assume experts to know better what the community should focus on.

The interaction process based on the Reputation Engine 230 comprises the following steps:

a) Receiving a portal page including a tag widget allowing to tag a certain item, b) Allowing the user to specify tags to be applied to the item to be tagged, c) Before storing the tag calculating the user's reputation to associate a weighting to the tag being applied
  Possible metric: How many tags has the user already applied?
  Possible metric: What is the average rating of the tags the users has applied? (Req. the option to rate tags)

d) Storing the tag together with the user reputation-based weighting.

The weight of the tags in the tag cloud only reflects the count of the tag. The magenta colored tags are tags applied from user "UserA" and the cyan colored tags are applied from user "UserB".

The 2nd tag cloud also considers the reputation level of the user, which applied the tag, to calculate the tag weight. Therefore it is allowed users to apply ratings to tags and to users of the community. The reputation level of a user could be determined by, e.g. calculating the median over all ratings applied to the user and over all ratings applied to tags of the user.

The FIG. 2 B shows, that user "UserB" got a better average rating then user "UserA". It an be seen the impact of this reputation level beneath. Even though, the tag "TagB" is applied as often as the tag "TagF", it is displayed with a lesser weight as tag "TagF", because of the better reputation level of "UserB" compared to "UserA".

E.g., in development team it is assumed that the tagging behavior of the team or technical lead of higher importance. With reputation-based tagging we also ensure that "incorrect or less suited" tags perceive lower weightings (influence). E.g., a newbie might apply a more "incorrect/less suited" tag as he just misunderstands.

Two mechanisms to determine the underlying reputation of a user are proposed:

First it is allowed users to be directly rated (e.g. a rating from 1 to 5 stars) by other users. Second, it is allowed users to rate tags which allows to calculate an average rating for all tags a certain user has applied; this average rating might be used as the reputation factor.

Expiry-Engine 200

In prior art tagging-enabled systems it is assumed that tags can be applied once and stay alive until they are manually deleted again. This lets to tag-space littering as most users never deleted tags anymore even if they became obsolete. The fact that tags do not remain valid forever occurs in Portals that provide dynamic content very often. This results in having a lot of tags assigned to resources that do not describe the resource adequately nor express the resources relevancy to the community appropriately anymore.

It is proposed to introduce a tag expiry mechanism allowing users to specify a chronological validity for tags when assigning them to a resource. Taggers can give tags a start date, an end date or a time frame in between they live.

We also allow tags that are assigned a "lifetime" to become more (or less) important as time passes by. For latter we allow taggers to select from a list of predefined weighting functions that influence tag weights based on time factors or to define their own function.

The interaction process based on the Expiry Engine 200 comprises the following steps:

a) Receiving a portal page including a tag widget allowing to tag a certain item, b) Allowing the user to specify tags to be applied to the item to be tagged, c) Further allowing to specify validate dates for the tag (start date, end date, etc.) describing in which time frames it should live, and d) Storing the tag together with its "validity range".

A clock icon in the upper right corner of a tag in the tag cloud, indicates that a lifetime is applied to the tag. If only one user has applied a lifetime to the tag, a tooltip appears during hovering over the tag and displays the dates of the lifetime. Otherwise, the clock icon implies that multiple lifetimes from different users are applied to the tag. The tag cloud could be filtered by specifying a date or dragging the date slider to the past or future. It let you navigate along the time line of the tag cloud and offers a filtered view of the cloud at the current time. To apply a tag with a lifetime, the user selects with a date picker the start date, the end date or both.

The new tags become apparent in tag clouds with respect to their validity again.

E.g. if there is a page in the Portal system providing information about the Olympic Games 2012, this page might become more and more interesting to users as we get nearer to the year 2012 and less interesting after 2012. Thus users can specify that the tag should not be available before 2011, vanish after 2013 and become more important from 2011 till 2012 and less important from 2012 till 2013. Thus, tag expiry is yet another mechanism to help the community to focus on what is currently really relevant.

Moreover, tag expiry allows us to neglect "invalid" tags from being considered when doing content adaptation or recommendation.

Context-Engine 220

Some tags are often used or applied in certain contexts only.

Of course tags needed by a user depend on the context he is acting in.

I.e. always displaying all tags part of a tag space is often not reasonable.

E.g. when traveling a user might be interested in tags such as airport, traffic information, weather-tags in which he might not be interested when being at the office.

Moreover, the importance of tags can change as users contexts change.

In a fictive development team the management might have decided that the most important hype topic is "tagging & rating".

Thus people started to extensively tag all resources that have something to do with this topic with "hot".

Weeks later management revised this decision and regarded "tagging & rating" as not very important anymore.

Thus, resources should not be tagged/rated "hot" anymore

Thus it is proposed a mechanism to associate tags to certain context profiles.

The interaction process based on the Context Engine 220 comprises the steps:

a) Receiving a portal page including a tag widget allowing to tag a certain item, b) Allowing the user to specify tags to be applied to the item to be tagged, c) Further allowing to specify the context in which this tag should be valid or automatically detecting the context in which it is applied, d) Storing the tag together with its "context profile".

The new tag weightings become apparent in tag clouds with respect to their context profile and the currently active context profile again. Contextual information can also be used in a different variation:

E.g. two tags "china" and "images" applied could express several things: Images from china; images about china, images drawn by Chinese artists and so forth.

There could also just be some nice images on the underlying resource and some side-information about China.

What it really means depends on in which context both tags have been applied.

The real meaning can be received statistically from crawling the web and taken into consideration Tag bags 110 can be created by users to group tags together (independent from any resource categorization); users could e.g. create a bag "sports" containing tags referring to sports stuff only like "soccer" or "basketball".

Tags can belong to different contexts (150); i.e. some tags are more important than others depending on the context a user is acting in; the context storage contains all contexts generally available. Users can switch between active contexts (or the system could do so automatically). Contexts identify themselves by a set of attributes and their values (like date, location, etc.).

FIG. 2 B shows a preferred embodiment of the storage implementation of the present invention.

The resources table 20 reflects the entities to which tags (or ratings) can be assigned. A resource has a unique ID making it identifiable, a creation and modification date and localized titles and descriptions. A resource also has an owner, the user who created or currently owns the resource.

Users 60 are the persons being part of the community interacting with the system. Users have an ID and, as resources, creation and modification dates, as well as a human-readable user name and a corresponding password; latter two are used as credentials for logging into the system, too.

Tags 70 have a unique ID making them identifiable, as well as, such as resources, creation and modification date. Tags are associated to resources, whereas resources could also be tags (or ratings) again (i.e. tags and ratings can become taggable resources, too). Tags have owners, identifying the person who has applied the tag to a resource. Tags also have a localized name, of course.

For realizing the tag expiration mechanisms tags can optionally have a start and end date set which reflects their lifetime. If only the start date is set the tag does only become active after that date, afterwards living forever. If only the end date is set the tag expires on that date, being active only before. If both is set the tag only lives between both dates.

The expiration function ID refers to a function that controls how time affects the tag's weight.

Tags can also have set the flags IS_FAVORITE or IS_NEGATIVE which reflect whether the tag is generally one of the user's favorite tags (independent from the underlying content to which it has been assigned) or whether it is a negative tag (explained in the enclosed text).

Tags can also have a reference to a context they belong to (explained later).

Categories 10: One important question is how resources and thus tags can be categorized (grouped); e.g. If you do not want to retrieve all tags for a single resources, but all tags to a group of resources, e.g. all books or all movies; this is what categories are used for Each resource can be part of none, one or more categories.

A category 10 has an unique ID, creation and modification dates, localized names and descriptions as well as references to tags that belong to it.

Similar than with tags, ratings 50 have IDs, creation and modification dates, an owner, and reference a resource (which can also be a tag, of course). Other than tags they have a numeric rating value.

Tag bags can be created by users to group tags together (independent from any resource categorization); users could e.g. create a bag "sports" containing tags referring to sports stuff only like "soccer" or "basketball"

Tag bags 80 can be easily accessed via UI fragments. Tag bags have a unique ID, creation and modification dates, localized titles and descriptions and references to tags that belong to the bag.

Contexts 30: Tags can belong to different contexts; i.e. some tags are more important than others depending on the context a user is acting in. The context table contains all contexts generally available. Users can switch between active contexts (or the system could do so automatically). Context 30 identify themselves by a set of attributes and their values (like date, location, etc.). Contexts 30 again have an unique ID, creation and modification dates, localized names and descriptions and refer to profile data which in turn contains a set of describing attributes and values The entire interaction process within the inventive tagging-enabled system is illustrated in FIG. 2 F.

The major change is that the tag weighting engine calculates tag weightings on tags' "frequency" only. It invokes sub-engines to calculate a more fine granular tag weighting.

As said, in prior art systems, the overall weighting for a single tag was only based on its frequence of occurrence.

As part of this invention the overall weighting for a single tag is, as already indicated, based on several metrics, making the weighting more reliable and accurate. Its overall weighting influences the visual representation of a tag in the widget (or tag cloud) and thus its importance.

The process to trigger the tag widget and to calculate the overall tag weighting is as follows:

During surfing through the information system, e.g. a Portal system, the user decides to inspect tags being available. As for each taggable resource buttons are available to launch the so called tag widget the user clicks one of these buttons for the resource he is interested in, e.g. a certain page (1).

As a result the tag widget appears (note that the tag widget might be a client-side component). As the tag widget is responsible for displaying the tags that have been assigned to this resource, whereas, as said, each tag is displayed in accordance to its importance (e.g. by using different font sizes or colouring) it sends a request to the server (or, more precisely, the service API responsible for the tagging functionality) asking for the required information (2).

In fact, the service API is responsible for returning both, the simple list of tags that have been assigned the resource and a weighting for each tag. Thus, the service API now invokes the tag weighting engine which performs two major operations (3):

First, it retrieves the list of tags available for the resource being requested by querying the underlying data storage which maintains the relationship between resources and tags (4). Second it invokes several sub-engines in sequence to determine an overall weighting for each tag of the previously determined list of tags:

The tag weighting engines invokes the quantitative engine (responding with a weighting factor F1) (6), the reputation engine (responding with a weighting factor F2)(7), the context engine (8) (responding with a weighting factor F3), and the expiry engine (9) (responding with a weighting factor F4). Based on the factors F1 . . . F4 the tag weighting engines calculates the overall weighting, e.g. based on the average of the values F1 . . . F4 5. After that the tag weighting engines returns the result (the list of tags and the overall weighting for each tag) to the service API (10).

The service API in turn returns the result to the tag widget.

The tag widget then displays the tags, whereas each tag is displayed in accordance to its importance (i.e. its overall weighting) (11).

The user is finally given the option to assign new tags to the resource via the tag widget (12). New tags are then stored in the previously mentioned data storage via the service API, too (13).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The invention claimed is:

1. A computer-implemented method by a server, comprising:

receiving, from a tag widget associated with a resource and within a client, a request for tags associated with the resource;

executing, responsive to the request, a tag weighting engine that identifies the tags and determines, respectively, individual overall weighting factors for each of the tags; and forwarding, to the tag widget within the client, the tags and associated overall weighting factors, wherein the individual overall weighting factors for a particular tag is based upon a combination of weighting factors including a context weight factor for the particular tag, the context weighting factor for the particular tag is based upon:

a past context for the particular tag specified by a past user who created the particular tag and an active context in which a current user of the tag widget is operating, and the past context describes a meaning of the particular tag as the particular tag was past used by the past user in a past application, and the active context describes a meaning of the particular tag as the particular tag is actively used by the current user in a current application.

2. The method of claim 1, wherein the weighting factors further includes a quantitative weighting factor, and the quantitative weighting factor for the particular tag is based upon a past user interaction with the particular tag, and a tag count associated with the quantitative weight factor is modified based upon the user interaction.

3. The method of claim 1, wherein the weighting factors further includes a reputation weighting factor, and the reputation weighting factor for the particular tag is based upon a reputation of the past user.

4. The method of claim 1, wherein the weighting factors further includes a reputation weighting factor, and the reputation weighting factor for the particular tag is based upon an expertise of the past user.

5. The method of claim 1, wherein the weighting factors further includes an expiry weighting factor, and the expiry weighting factor for the particular tag is based upon a time frame for the particular tag specified by the past user.

* * * * *